(12) United States Patent
Tang et al.

(10) Patent No.: US 8,630,847 B2
(45) Date of Patent: Jan. 14, 2014

(54) WORD PROBABILITY DETERMINATION

(75) Inventors: Xiliu Tang, Beijing (CN); Xianping Ge, Cupertino, CA (US)

(73) Assignee: Google Inc., Mountain View, CA (US)

( * ) Notice: Subject to any disclaimer, the term of this patent is extended or adjusted under 35 U.S.C. 154(b) by 734 days.

(21) Appl. No.: 11/870,068

(22) Filed: Oct. 10, 2007

(65) Prior Publication Data

US 2008/0319738 A1 Dec. 25, 2008

Related U.S. Application Data

(63) Continuation of application No. PCT/CN2007/001969, filed on Jun. 25, 2007.

(51) Int. Cl.
*G06F 17/20* (2006.01)
*G06F 17/28* (2006.01)
*G06F 17/21* (2006.01)
*G06F 17/30* (2006.01)

(52) U.S. Cl.
USPC ........... 704/10; 704/1; 704/4; 704/7; 715/259

(58) Field of Classification Search
USPC ....................................................... 704/1–10
See application file for complete search history.

(56) References Cited

U.S. PATENT DOCUMENTS

| | | | |
|---|---|---|---|
| 6,356,866 B1* | 3/2002 | Pratley et al. | 704/9 |
| 6,640,006 B2* | 10/2003 | Wu et al. | 382/177 |
| 6,671,683 B2* | 12/2003 | Kanno | 707/5 |
| 6,822,585 B1* | 11/2004 | Ni et al. | 341/28 |
| 6,879,951 B1* | 4/2005 | Kuo | 704/10 |
| 7,315,982 B2* | 1/2008 | Becker | 715/262 |
| 7,917,355 B2* | 3/2011 | Wu et al. | 704/10 |
| 2005/0209844 A1* | 9/2005 | Wu et al. | 704/2 |
| 2005/0289463 A1* | 12/2005 | Wu et al. | 715/533 |
| 2006/0015326 A1 | 1/2006 | Mori et al. | |
| 2006/0206313 A1* | 9/2006 | Xu et al. | 704/10 |

FOREIGN PATENT DOCUMENTS

| | | |
|---|---|---|
| CN | 1447264 | 10/2003 |
| JP | 10171819 A | 6/1998 |

OTHER PUBLICATIONS

Jia-lin Tsai. Using Word-Pair Identifier to Improve Chinese Input System (2005). Proceedings of the Fourth SIGHAN Workshop on Chinese Language Processing, IJCNLP2005.*
Jing-shin Chang, Keh-yih Su. An Unsupervised Iterative Method for Chinese New Lexicon Extraction (1997). International Journal of Computational Linguistics & Chinese Language Processing.*
Sproat, R., Gale, W., Shih, C., and Chang, N. 1996. A stochastic finite-state word-segmentation algorithm for Chinese. Comput. Linguist. 22, 3 (Sep. 1996), 377-404.*

(Continued)

*Primary Examiner* — Pierre-Louis Desir
*Assistant Examiner* — Matthew Baker
(74) *Attorney, Agent, or Firm* — Remarck Law Group PLC

(57) ABSTRACT

A word corpus is identified and a word probability value is associated with each word in the word corpus. A sentence is identified, candidate segmentations of the sentence are determined based on the word corpus, and the associated probability value for each word in the word corpus is iteratively adjusted based on the probability values associated with the words and the candidate segmentations.

26 Claims, 5 Drawing Sheets

(56) References Cited

OTHER PUBLICATIONS

Ge, X., Pratt, W., and Smyth, P. 1999. Discovering Chinese words from unsegmented text (poster abstract). In Proceedings of the 22nd Annual international ACM SIGIR Conference on Research and Development in information Retrieval (Berkeley, California, United States, Aug. 15-19, 1999). SIGIR '99. ACM, New York, NY, 271-272. DOI= http://doi.acm.or.*

S.-S. Kang and C.-W. Woo. 2001. Automatic segmentation of words using syllable bigram statistics. In Proceedings of the 6th Natural Language Processing Pacific Rim Symposium, pp. 729-732.*

Fuchun Peng, Supervisor Prof: Dale Schuurmans, Prof Frank Tompa. The Sparse Data Problem in Statistical Language Modeling and Unsupervised Word Segmentation. Oct. 2001.*

Ming Zhou, Yuan Ding, Changning Huang. Improving Translation Selection with a New Translation Model Trained by Independent Monolingual Corpora. Computational Linguistics and Chinese Language Processing. vol. 6, No. 1, Feb. 2001, pp. 1-26.*

GenQing Wu and Fang Zheng. A method to build a super small but practically accurate language model for handheld devices. Journal of computer science and technology vol. 18, num. 6, 747-755.*

Ponte, J. and Croft, W.; Useg: A retargetable word segmentation procedure for information retrieval. Symposium on Document Analysis and Information Retrival 96 (SDAIR).*

Xiangji Huang, Fuchun Peng, Dale Schuurmans, Nick Cercone, Stephen E. Robertson. Applying Machine Learning to Text Segmentation for Information Retrieval. Information Retrieval.Sep. 2003, vol. 6, Issue 3-4, pp. 333-362.*

Fuchun Peng, Xiangji Huang, Dale Schuurmans, and Nick Cercone. 2002. Investigating the relationship between word segmentation performance and retrieval performance in Chinese IR. In Proceedings of the 19th international conference on Computational linguistics—vol. 1 (COLING '02), vol. 1.*

Fuchun Peng, Xiangji Huang, Dale Schuurmans, and Nick Cercone. 2003. Applying Machine Learning to Text Segmentation for Information Retrieval. Information Retrieval, 6, 333-362, 2003.*

Fuchun Peng and Dale Schuurmans. 2001. Self-Supervised Chinese Word Segmentation. InProceedings of the 4th International Conference on Advances in Intelligent Data Analysis (IDA '01), Frank Hoffmann, David J. Hand, Niall M. Adams, Douglas H. Fisher, and Gabriela Guimarães (Eds.). Springer-Verlag, London, UK, UK, 238-247.*

Honglan Jin and Kam-Fai Wong. 2002. A Chinese dictionary construction algorithm for information retrieval. 1, 4 (Dec. 2002), 281-296. DOI=10.1145/795458.795460 http://doi.acm.org/10.1145/795458.795460.*

R. Florian, H. Hassan, A. Ittycheriah, H. Jing, N. Kambhatla, X. Luo, N. Nicolov, and S. Roukos. 2004. A statistical model for multilingual entity detection and tracking. In of HLT-NAACL.*

Cui et al., "New Word Detection Based on Large-Scale Corpus," *Journal of Computer Research and Development* 43(5):927-932 (2006) (English version of abstract only).

Feng et al., "Research and Realization on Self-Feeding Back Chinese Words Segmentation System," *Computer Technology and Development*, 16(5):7-9 (2006).

International Preliminary Report on Patentability for PCT Application No. PCT/CN2007/001969, mailed Jan. 14, 2010, 6 pages.

International Search Report and Written Opinion for PCT Application No. PCT/CN2007/001969, mailed Apr. 3, 2008, 10 pages.

Shiqi, C. et al., "New Word Detected Based on Large-Scale Corpus," Journal of Computer Research and Development, 2006, 43(5): 927-932.

* cited by examiner

WORD PROBABILITY DETERMINATION

RELATED APPLICATION

This application is a continuation of International Application No. PCT/CN2007/001969, titled "WORD PROBABILITY DETERMINATION", filed on Jun. 25, 2007, the contents of which are incorporated herein by reference.

BACKGROUND

This disclosure relates to input methods.

Languages that use a logographic script in which one or two characters, e.g., glyphs, correspond roughly to one word or meaning have more characters than keys on a standard input device, such as a computer keyboard on a mobile device keypad. For example, the Chinese language contains thousands of characters defined by base Pinyin characters and five tones. The mapping of these many-to-one associations can be implemented by input methods that facilitate entry of characters and symbols not found on input devices. Accordingly, a Western-style keyboard can be used to input Chinese, Japanese, or Korean characters.

In some examples, an input method editor (IME) can be used to search a dictionary of words to find candidate words that correspond to the Pinyin characters typed by a user. The dictionary can include data associated with the words, e.g., probability scores, that allows the IME to predict the user's intention and to identify and rank the candidates. The IME ranks the candidates based on, for example, probability or accuracy scores, and provides a list of the candidate words to the user in a sequence according to the ranking.

SUMMARY

In one aspect, in general, a computer-implemented method, includes identifying a word corpus, associating a word probability value with each word in the word corpus, identifying a sentence, determining candidate segmentations of the sentence based on the word corpus, and iteratively adjusting the associated probability value for each word in the word corpus based on the probability values associated with the words and the candidate segmentations.

Implementations of the method can include one or more of the following features. The method includes storing a portion of the word corpus defined by words having the highest associated word probability values in an input method editor dictionary. The word probability values correspond to a probability of associated words appearing in the sentence. Determining possible segmentations of at least one sentence includes determining all possible segmentations of the at least one sentence based on the word corpus. The method includes determining a segmentation probability value for each candidate segmentation of the sentence. Determining a segmentation probability value for each candidate segmentation of the sentence includes determining the segmentation probability value for each candidate segmentation based on the word probability values associated with the words in the candidate segmentation.

Iteratively adjusting the associated word probability value for each word in the word corpus based on the associated word probability values and the candidate segmentations includes iteratively adjusting the associated word probability value for each word based on the segmentation probability values for the candidate segmentations of the sentence. Iteratively adjusting the associated word probability value for each word includes, for each iteration, determining the segmentation probability value for each candidate segmentation of the sentence based on the word probability values associated with the words in the candidate segmentation, and adjusting the associated word probability value for each word based on the segmentation probability values for the candidate segmentations that include the word. Determining a refined probability value of a word in the sentence includes multiplying (a) a sum of the probability values of candidate segmentations of a substring before the word, (b) the probability value of the word, and (c) a sum of the probability values of candidate segmentations of a substring after of the word. Determining candidate segmentations of the sentence includes determining candidate segmentations of a plurality of sentences in a document. The method includes identifying sentences in a plurality of documents, and for each sentence, determining candidate segmentations of the sentence based on the word corpus. Sentences in different types of documents are given different weights in determining the word probability values. The documents are accessible over a public network, the Internet, or provided by a plurality of third parties. The words include at least one of Chinese, Japanese, and Korean characters. The words include Hanzi characters.

In another aspect, in general, a computer-implemented method includes determining word probability values associated with words of a word corpus, determining candidate segmentations of sentences of documents in a document corpus, iteratively determining a segmentation probability value for each candidate segmentation of each sentence based on the word probability values associated with the words in the candidate segmentation, and iteratively adjusting the word probability value for each word based on the segmentation probability values for the candidate segmentations that include the word.

Implementations of the method can include one or more of the following features. The method includes identifying document types for the documents, assigning weights to sentences in the documents based on the identified document type, and determining one of the segmentation probability values or the word probability values based on the weights. The method includes accumulating a count for each word based on the segmentation probability values of the segmentations that include the word. Accumulating the count for each word includes determining a sum of the segmentation probability values of the segmentations that include the word. The method includes determining the word probability value for each word by normalizing the count for the word based on a normalization factor. The method includes determining the normalization factor by determining a sum of the counts of all the words.

In another aspect, in general, a system includes a data store to store a word corpus and a document corpus, and a processing engine stored in computer readable medium and includes instructions executable by a processing device. Upon execution of the instructions, the processing device associates a word probability value with each word in the word corpus, determines candidate segmentations of each sentence of each document in the document corpus based on the word corpus, and iteratively adjusts the associated word probability value for each word in the word corpus based on the associated word probability values and the candidate segmentations.

In another aspect, in general, a system includes a data store to store a word corpus and a document corpus, and a processing device to associate a word probability value with each word in the word corpus, determine candidate segmentations of each sentence of each document in the document corpus based on the word corpus, and iteratively adjust the associated word probability value for each word in the word corpus based on the associated word probability values and the candidate segmentations.

In another aspect, in general, a system includes a data store to store a word corpus and a document corpus, and a processing device. The processing device determines word probability values associated with words of the word corpus, determines candidate segmentations of sentences of documents in the document corpus, iteratively determines a segmentation probability value for each candidate segmentation of each sentence based on the word probability values associated with the words in the candidate segmentation, and iteratively adjusts the word probability value for each word based on the segmentation probability values for the candidate segmentations that include the word.

In another aspect, in general, a system includes a data store and a processing device. The data store stores a dictionary that includes words and associated word probability values that are determined using an iterative process, the iterative process including iteratively determining segmentation probability values for candidate segmentations of sentences of documents, and iteratively adjusting the word probability values for the word based on the segmentation probability values. The processing device provides an input method editor configured to select words from the dictionary.

In another aspect, in general, a system includes means for associating a word probability value with words in a word corpus, means for identifying sentences in a plurality of documents, means for determining candidate segmentations of each of the sentences based on the word corpus, and means for iteratively adjusting the associated word probability value for each word in the word corpus based on the associated word probability values and the candidate segmentations.

In another aspect, in general, a system includes means for determining word probability values associated with words of a word corpus, means for determining candidate segmentations of sentences of documents in a document corpus, means for iteratively determining a segmentation probability value for each candidate segmentation of each sentence based on the word probability values associated with the words in the candidate segmentation, and means for iteratively adjusting the word probability value for each word based on the segmentation probability values for the candidate segmentations that include the word.

The systems and methods disclosed herein may have one or more of the following advantages. A dictionary can be automatically optimized base on a corpus of documents, and the optimized dictionary can facilitate the identification and selection for candidate words. Likewise, an IME utilizing the dictionary can provide fewer and/or more accurate identifications of candidate words for selection. The speed and efficiency for the computer processing the logographic script, e.g., Chinese characters, can be improved. A user of the dictionary may easily obtain the desirable candidate words with highest probability values, so that the user's input speed of the logographic script can be increased.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
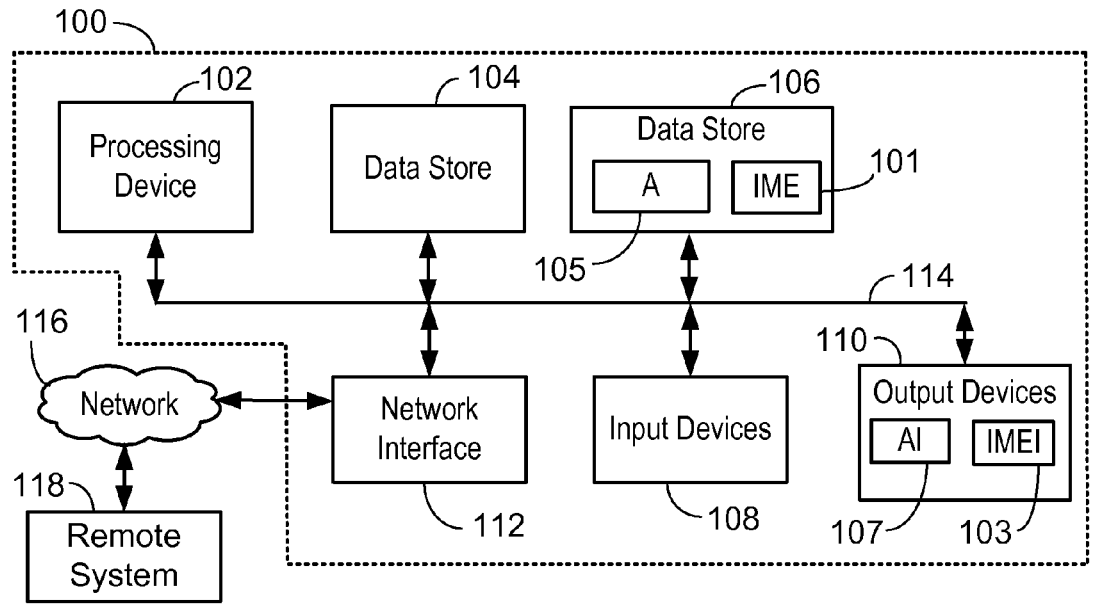
FIG. 1 is a block diagram of an example device that can be used to implement the systems and methods described herein.

FIG. 1 is a block diagram of an example device 100 that can be utilized to implement the systems and methods described herein. The device 100 can, for example, be implemented in a computer device, such as a personal computer device, or other electronic devices, such as a mobile phone, mobile communication device, personal digital assistant (PDA), and the like.

The example device 100 includes a processing device 102, a first data store 104, a second data store 106, input devices 108, output devices 110, and a network interface 112. A bus system 114, including, for example, a data bus and a motherboard, can be used to establish and control data communication between the components 102, 104, 106, 108, 110 and 112. Other example system architectures can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

Example input devices 108 can include a keyboard, a mouse, a stylus, etc., and example output devices 110 can include a display device, an audio device, etc. The network interface 112 can, for example, include a wired or wireless network device operable to communicate data to and from a network 116. The network 116 can include one or more local area networks (LANs) and/or a wide area network (WAN), such as the Internet.

In some implementations, the device 100 can include input method editor (IME) code 101 in a data store, such as the data store 106. The input method editor code 101 can be defined by instructions that upon execution cause the processing device 102 to carry out input method editing functions. In an implementation, the input method editor code 101 can, for example, comprise interpreted instructions, such as script instructions, e.g., JavaScript or ECMAScript instructions, that can be executed in a web browser environment. Other implementations can also be used, e.g., compiled instructions, a stand-alone application, an applet, a plug-in module, etc.

Execution of the input method editor code 101 generates or launches an input method editor instance 103. The input method editor instance 103 can define an input method editor environment, e.g., user interface, and can facilitate the processing of one or more input methods at the device 100, during which time the device 100 can receive composition inputs for input characters, ideograms, or symbols, such as, for example, Hanzi characters. For example, the user can use one or more of the input devices 108 (e.g., a keyboard, such as a Western-style keyboard, a stylus with handwriting recognition engines, etc.) to input composition inputs for identification of Hanzi characters. In some examples, a Hanzi character can be associated with more than one composition input.

The first data store 104 and/or the second data store 106 can store an association of composition inputs and characters. Based on a user input, the input method editor instance 103 can use information in the data store 104 and/or the data store 106 to identify one or more candidate characters represented by the input. In some implementations, if more than one candidate character is identified, the candidate characters are displayed on an output device 110. Using the input device 108, the user can select from the candidate characters a Hanzi character that the user desires to input.

In some implementations, the input method editor instance 103 on the device 100 can receive one or more Pinyin composition inputs and convert the composition inputs into Hanzi characters. The input method editor instance 103 can, for example, use compositions of Pinyin syllables or characters received from keystrokes to represent the Hanzi characters. Each Pinyin syllable can, for example, correspond to a key in the Western style keyboard. Using a Pinyin input method editor, a user can input a Hanzi character by using composition inputs that include one or more Pinyin syllables representing the sound of the Hanzi character. Using the Pinyin IME, the user can also input a word that includes two or more Hanzi characters by using composition inputs that include two or more Pinyin syllables representing the sound of the Hanzi characters. Input methods for other languages, however, can also be facilitated.

Other application software 105 can also be stored in data stores 104 and/or 106, including web browsers, word processing programs, e-mail clients, etc. Each of these applications can generate a corresponding application instance 107. Each application instance can define an environment that can facilitate a user experience by presenting data to the user and facilitating data input from the user. For example, web browser software can generate a search engine environment; e-mail software can generate an e-mail environment; a word processing program can generate an editor environment; etc.

In some implementations, a remote computing system 118 having access to the device 100 can also be used to edit a logographic script. For example, the device 100 may be a server that provides logographic script editing capability via the network 116. In some examples, a user can edit a logographic script stored in the data store 104 and/or the data store 106 using a remote computing system, e.g., a client computer. The device 100 can, for example, select a character and receive a composition input from a user over the network interface 112. The processing device 102 can, for example, identify one or more characters adjacent to the selected character, and identify one or more candidate characters based on the received composition input and the adjacent characters. The device 100 can transmit a data communication that includes the candidate characters back to the remote computing system.

Figure 2:
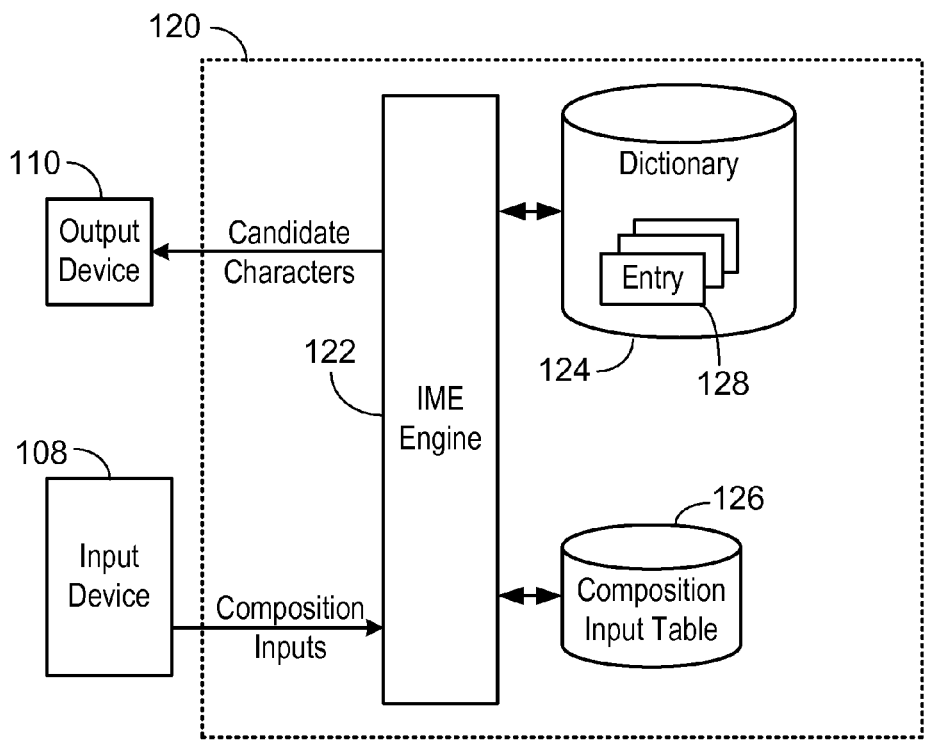
FIG. 2 is a block diagram of an example editing system.

FIG. 2 is a block diagram of an example input method editor system 120. The input method editor system 120 can, for example, be implemented using the input method editor code 101 and associated data stores 104 and 106. The input method editor system 120 includes an input method editor engine 122, a dictionary 124, and a composition input table 126. Other storage architectures can also be used. A user can use the IME system 120 to enter, for example, Chinese words or phrases by typing Pinyin characters, and the IME engine 122 will search the dictionary 124 to identify candidate dictionary entries each including one or more Chinese words or phrases that match the Pinyin characters.

The dictionary 124 includes entries 128 that correspond to characters, words, or phrases of a logographic script used in one or more language models, and characters, words, and phrases in Roman-based or western-style alphabets, for example, English, German, Spanish, etc. Each word corresponds to a meaning and may include one or more characters. For example, a word ("苹果") having the meaning "apple" includes two Hanzi characters "苹" and "果" that correspond to Pinyin inputs "ping" and "guo," respectively. The character "果" is also a word that has the meaning "fruit." The dictionary entries 128 may include, for example, idioms (e.g., "胸有成竹"), proper names (e.g., "奥地利共和国", meaning "Republic of Austria"), names of historical characters or famous people (for example, "成吉思汗", meaning "Genghis Khan"), terms of art (e.g., "全球定位系统", meaning "Global Positioning System"), phrases ("一去不复返"), book titles (for example, "红楼梦", meaning "Dream of the Red Chamber"), titles of art works (for example, "清明上河图", meaning "Upper River During the Qing Ming Festival"), and movie titles (for example, "卧虎藏龙", meaning "Crouching Tiger, Hidden Dragon"), etc., each including one or more characters.

Similarly, the dictionary entries 128 may include, for example, names of geographical entities or political entities, names of business concerns, names of educational institutions, names of animals or plants, names of machinery, song names, titles of plays, names of software programs, names of consumer products, etc. The dictionary 124 may include, for example, thousands of characters, words and phrases.

In some implementations, the dictionary 124 includes information about relationships between characters. For example, the dictionary 124 can include scores or probability values assigned to a character depending on characters adjacent to the character. The dictionary 124 can include entry scores or entry probability values each associated with one of the dictionary entries 128 to indicate how often the entry 128 is used in general.

The composition input table 126 includes an association of composition inputs and the entries 128 stored in the dictionary 124. In some implementations, the composition input table 126 can link each of the entries in the dictionary 124 to a composition input (e.g., Pinyin input) used by the input method editor engine 122. For example, the input method editor engine 122 can use the information in the dictionary 124 and the composition input table 126 to associate and/or identify one or more entries in the dictionary 124 with one or more composition inputs in the composition input table 126. Other associations can also be used.

In some implementations, the candidate selections in the IME system 120 can be ranked and presented in the input method editor according to the rank.

Figure 3:
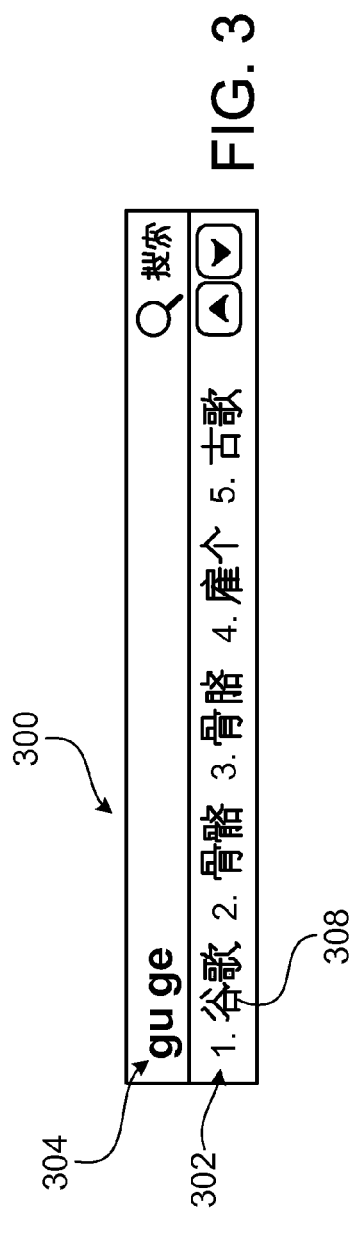
FIG. 3 is a diagram of an example input method editor environment.

FIG. 3 is a diagram of an example input method editor environment 300 presenting five ranked candidate selections 302. Each candidate selection can be a dictionary entry 128 or a combination of dictionary entries 128. The candidate selections 302 are identified based on the Pinyin inputs 304. A selection indicator 308 surrounds the first candidate selection, i.e., "谷歌", indicating that the first candidate selection is selected. The user can also use a number key to select a candidate selection, or use up and down arrow keys to move the selection indicator 308 to select the candidate selection.

As described above, the IME engine 122 accesses the dictionary 124 to identify candidate entries 128 that are associated with Pinyin characters entered by the user. The IME engine 122 uses the entry probability values to rank the candidate entries and determine placement of the candidate entries in the IME environment 300. For example, a candidate entry having the highest entry probability value may be placed by the IME engine 122 at the first position in the IME environment 300.

The dictionary 124 can be updated with new words, names, or phrases periodically. The probability values of the entries 128 in the dictionary 124 may change over time. For example, characters, words, and phrases that are commonly typed by users of the IME system 120 may change over time in response to news events and changes in the society. In some implementations, the entry probability values associated with the entries 128 of the dictionary 124 can be established and/or updated based on estimated frequencies of characters, words, and phrases in a document corpus.

Figure 4:
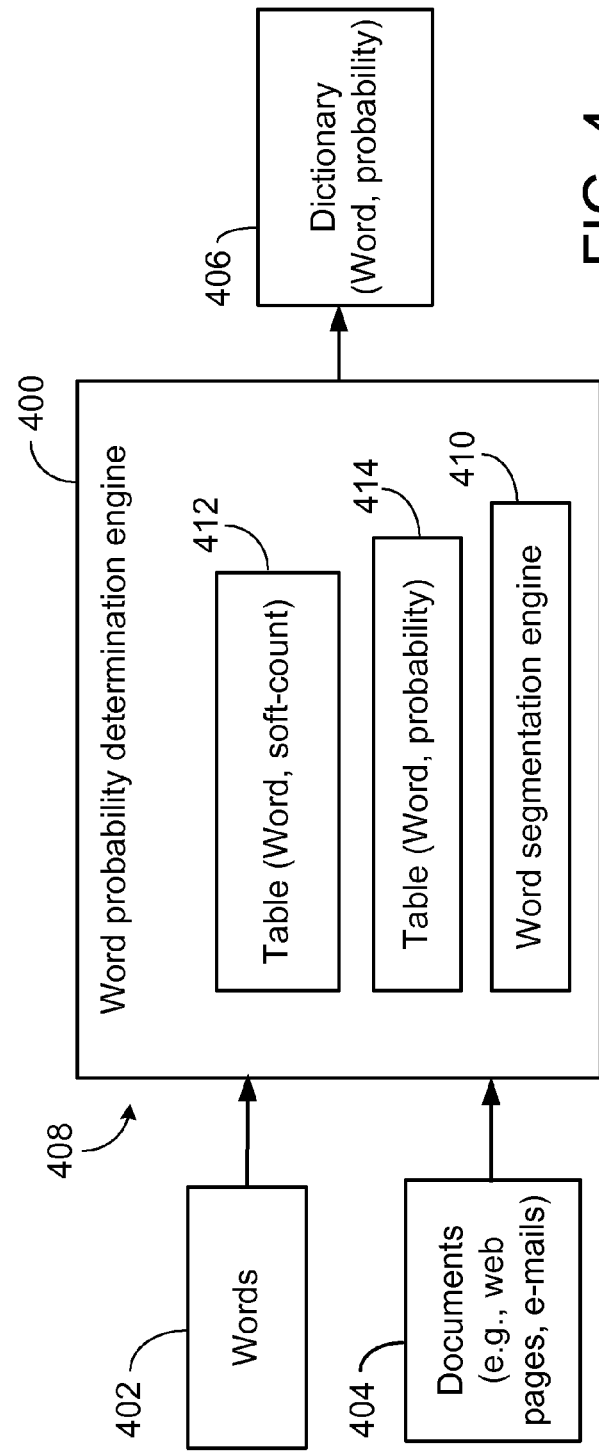
FIG. 4 is a diagram of an example word probability determination engine.

FIG. 4 is a diagram of an example word probability determination engine 400 that can, for example, generate a dictionary 406 that stores selected words and probability values associated with the selected words. Each word can have one or more characters, such as one or more Hanzi characters. In some examples, the word corpus 402 can be provided in a table that includes entries, each entry including one word. The word corpus 402 can also be a text file that includes words separated by non-character symbols (e.g., commas or semi-colons). For each word in the word corpus 402, the word probability determination engine 400 uses an iterative process to determine the probability of occurrences of the word in a document corpus 404. The word corpus 402 and the document corpus 404 can be stored in a data store.

In this description, the term "word" depending on context may be broadly defined to include a sequence of consecutive characters that may include one or more words. Each "word" in the word corpus 402 is a candidate for an entry in the dictionary 124, and each entry in the dictionary 124 may include one or more words. For example, in the case where the word corpus 402 is provided in a table, the word probability determination engine 400 treats each entry as a word, even though the entry may include more than one word. For example, an entry may include a phrase, an idiom, a proper name, a name of a historical character or famous person, a term of art, a book title, a title of an art work, a movie title, etc. Likewise, in the case where the word corpus 402 is provided as a text file in which words are separated by non-character symbols (e.g., commas), the word probability determination engine 400 treats each sequence of consecutive characters between two symbols as a word, even though the sequence of consecutive characters may include more than one word. Thus, for example, "苹果", "胸有成竹", "奥地利 共和国", "成",信思汁", "全球定位系统", "一去不复返", "红楼梦", "清明上河图", "卧虎藏龙", etc., are all treated as words by the word probability determination engine 400.

In some examples, the word corpus 402 can include words of the Chinese language and other languages. The dictionary 406 can, for example, be generated from a word corpus 402 and a document corpus 404. The word corpus 402 can be obtained from pre-established dictionaries, user search queries, or various types of documents. The word corpus 402 can, for example, include thousands or more words and phrases. In some implementations, the dictionary 406 can include a subset of words and phrases in the word corpus 402.

In some examples, a number of highest ranking words and phrases in the set 402 are selected and added to the dictionary 406. Each of the selected words and phrases becomes an entry of the dictionary 406. The probability values associated with the words and phrases become the probability values associated with the dictionary entries. The entries of the dictionary 406 can be added to the dictionary 124 and be used by the IME engine 122 to identify candidate entries that match Pinyin characters entered by the user.

The document corpus 404 can, for example, include documents that can be accessed over a network, e.g., web pages, e-mail messages, etc. The document corpus 404 can include, e.g., e-books, journal articles, advertisements, instant messages, blogs, legal documents, or other types of documents. The document corpus 404 may include documents that cover a wide variety of subjects, such as news, movies, music, political debates, scientific discoveries, legal issues, health issues, environmental issues, etc. The document corpus 404 can be established by gathering documents from, e.g., a corporate Intranet or the public Internet. The number of documents processed can thus be in the range of millions of documents, or more. The documents may include, e.g., Hanzi characters, English characters, numbers, punctuation marks, symbols, HTML codes, etc. Other documents can also be used, e.g., an electronic collection of literary works, an electronic library, etc.

As described below, the word probability determination engine 400 utilizes an iterative process to determine probability values of words in a word corpus 402 based on the frequencies of occurrences of the words in a document corpus 404. To implement the iterative process for determining word probability values, the word probability determination engine 400 assigns an initial "soft-count" to each word in the word corpus 402 and determines an initial probability value for each word. The soft-counts and probability values can, for example, be stored in one or more data stores, such as a table 412 of words and associated soft-count values, and a table 414 of words and associated probability values. Other data storage architectures can also be used.

The word probability determination engine 400 can include a word segmentation engine 410 that divides each of the documents 404 into sentences, and identifies all possible segmentations (each referred to as a "candidate segmentation") of each sentence based on the words in the word corpus 402. After each sentence of the documents 404 is segmented into segments, each segment is a word in the word corpus 402. In some implementations, a "sentence" refers to a continuous string of Hanzi characters between two non-Hanzi characters, e.g., punctuation marks, numbers, symbols, or HTML codes. Thus, each sentence being processed by the word probability determination engine 400 is not necessarily a complete sentence as defined by the language rules.

In some implementations, in each iteration of the iterative process, the word probability values are used to determine probability values for each candidate segmentation, and the segmentation probability values are used to adjust the word probability values. Iterations can continue until a convergence condition or termination condition occurs, e.g., the highest 100,000 word probability values stabilize, or 100 iterations are completed. In some examples, the word probability values converge after less than 100 iterations.

In some implementations, the sentences can be modeled using Hidden Markov Models, in which the correct segmentations of the sentences are unknown. For example, an Expectation-Maximization algorithm can be utilized to implement an expectation process and a maximization process. The expectation process determines the expected likelihood (or probability) of each segmentation for all possible segmentations of all the sentences in the document corpus 404. The maximization process determines the probability values of each word by adding the probability values of all segmentations in which the word appears, and normalizing the sum using a normalization factor. The Expectation-Maximization algorithm identifies word probability values and segmentations that tend to maximize the probability values of the segmentations. For example, a given sentence is segmented into [w1][w2] . . . [wk] such that Πp($w_i$) is maximized, where each of [w1], [w2], . . . , and [wk] can be a word in the word corpus 402, and p($w_i$) is the word probability value associated with the word $w_i$. Other iterative processes can also be used to maximize word probability values.

For example, the word corpus 402 may include the words [全], [球], [最], [大], [的], [搜], [索], [引], [擎], [全球], [最大], [全球最大], [搜索], [引擎], [搜索引擎], where [ ] denotes a word. A sentence "全球最大的搜索引擎" can be segmented into segments in several ways based on the words in the word corpus 402, including the following:

[全][球][最][大][的][搜][索][引][擎],

[全球][最大][的][搜][索][引][擎],

[全球][最大][的][搜索][引][擎], and

[全球最大][的][搜索引擎], etc.

In the above example segmentations, each segment is a word in the word corpus 402. Here, the term "segmentation" refers to the way that a sentence is segmented. Thus, [全][球][最][大][的] [搜][索][引][擎] is one segmentation, and [全球最大][的][搜索引擎] is another segmentation. Each segmentation can have one or more segments. For example, the segmentation [全][球][最][大][的][搜][索][引][擎] includes 9 segments: [全], [球], [最], [大], [的], [搜], [索], [引], and [擎]. The segmentation [全球最大][的][搜索引擎] includes 3 segments: [全球最大], [的], and [搜索引擎].

As another example, suppose the word corpus 402 includes the words [A], [B], [C], [AB], [BC], [ABC], [D], and [E], where each of "A," "B," "C," etc., denotes a Hanzi character. Based on the words in the word corpus 402, a sentence "ABCDAE" can be segmented in four different ways:
 [ABC][D][A][E],
 [AB][C][D][A][E],
 [A][BC][D][A][E], and
 [A][B][C][D][A][E].

The word probability determination engine 400 assigns an initial "soft-count" to each word in the word corpus 402 and determines an initial probability value for each word. The word soft-count corresponds to the number of occurrences of the word in the various segmentations of the sentences, taking into account the probability values of the segmentations. In some implementations, words in the document corpus 404 that are not in the word corpus 402 can be assigned low initial probability values. In other implementations, words in the document corpus 404 that are not in the word corpus 402 can be ignored.

In the example above, assume that each of the words [A], [B], [C], [AB], [BC], [ABC], [D], and [E] is initially assigned a soft-count of 1. The probability value of each word is determined to be ⅛, as the sum of all the probability values of all words is equal to 1. In the first iteration, the word probability determination engine 400 determines the probability value of each segmentation based on the probability values of the words in the segmentation. The segmentation probability value can be determined by, e.g., multiplying the word probability values of all the words in the segmentation. For example, the probability values of the segmentations of the sentence "ABCDAE" can be as follows:

$P([ABC][D][A][E]) = (⅛)^4 = 0.000244,$ $P([AB][C][D][A][E]) = (⅛)^5 = 0.0000305,$ $P([A][BC][D][A][E]) = (⅛)^5 = 0.0000305,$ and $P([A][B][C][D][A][E]) = (⅛)^6 = 0.00000381,$ where P([ ][ ][ ]) denotes the probability value of a segmentation [ ][ ][ ].

The segmentation probability values are then used to adjust the soft-counts of the words. If a word occurs in a segmentation with likelihood $p_i$, the soft-count value for each word in the segmentation is increased by $$\frac{p_i}{\sum_{j=1}^{t} p_j}$$

for each occurrence of the word, where t is the total number of possible segmentations, and $$\sum_{j=1}^{t} p_j$$

is a normalization factor that is equal to the sum of the likelihood of all possible segmentations. The soft-count of a particular word can be determined by adding the contributions of the segmentation probability values of all the segments in which the word appears, divided by a normalization factor. The normalization factor can be, for example, the sum of all segmentation probability values. In the above example, the normalization factor can be equal to $(⅛)^4+(⅛)^5+(⅛)^5+(⅛)^6=0.000309$.

In the example above, the word [A] appears once in the segmentations [ABC][D][A][E] and [AB][C][D][A][E], and appears twice in the segmentations [A][BC][D][A][E] and [A][B][C][D][A][E], so the soft count of A is be $$S(A) = ((1/8)^4 + (1.8)^5 + (1/8)^5 * 2 + (1/8)^6 * 2)/0.000309 = 0.000343/0.000309 = 1.11$$

The word [B] appears in the segmentation [A][B][C][D][A][E] once, so the soft-count of the word [B] is equal to $(⅛)^6/0.000309=0.0123$. The word [C] appears in each of the segmentations [AB][C][D][A][E] and [A][B][C][D][A][E] once, so the soft-count of the word [C] is equal to $((⅛)^5+(⅛)^6)/0.000309=0.111$. The word [D] and [E] both appear in each of the segmentations once, so the soft-count of the words [D] and [E] are both equal to $((⅛)^4+(⅛)^5+(⅛)^6+(⅛)^5)/0.000309=1$. The word [AB] appears in the segmentation [AB][C][D][A][E] once, so the soft-count of the word [AB] is equal to $(⅛)^5/0.000309=0.0988$. The word [BC] appears in the segmentation [A][BC][D][A][E] once, so the soft-count of the word [BC] is equal to $(⅛)^5/0.000309=0.0988$. The word [ABC] appears in the segmentation [ABC][D][A][E] once, so the soft-count of the word [ABC] is equal to $(⅛)^4/0.000309=0.79$.

At the end of the first iteration, the soft-counts of the words are as follows:

$S([A])=1.11,$ $S([B])=0.0123,$ $S([C])=0.111,$ $S([D])=1,$ $S([E])=1,$ $S([AB])=0.0988,$ $S([BC])=0.0988,$ and $S([ABC])=0.79,$ where S([ ]) denotes the soft-count of the word [ ]. The word soft-counts are stored in a table 412, and the next sentence, e.g., "ABABCDD" is processed to generate another set of word soft-counts. All the sentences in the documents 404 are processed in a similar manner, producing a set of word soft-counts for each of the sentences.

In some implementations, different types of documents in the document corpus 404 can be given different weights, and the probability values of the candidate segmentations of a sentence from a particular type of document can be multiplied by a weight value associated with the particular type of document. For example, documents that are more formal and have words that are more accurate may be given higher weights than documents that are less formal and may include misspelled words. For example, news documents produced by major newspaper or magazine publishers may be given a weight of 17, blog documents generated by individuals may be given a weight of 10, other common web documents may be given a weight of 1, and e-mail messages may be given a weight of 0.7.

Using the example above, the segmentation probability values derived from the news documents of major newspaper or magazine publishers may be multiplied by 17, the segmentation probability values derived from the blog documents of individuals may be multiplied by 10, the segmentation probability values derived from other types of web documents may be multiplied by 1, and the segmentation probability values derived from e-mail messages may be multiplied by 0.7. Because the soft-counts are derived from the segmentation probability values, the soft-counts are thus also weighted based on the document types.

In some implementations, the word soft-counts derived from all the sentences in all the documents are combined by adding the respective soft-counts of each word. For example, the final soft-count of the word [A] is obtained by accumulating (e.g., adding) the soft-counts of the word [A] derived from all of the sentences of all of the documents. The probability value of each word is determined by dividing the soft-count of the word by a normalization factor. The normalization factor can be, for example, the sum of soft-counts of all words.

For example, suppose the accumulated soft-counts of the words are:

$S([A])=10,$ $S([B])=2,$ $S([C])=3,$ $S([D])=1,$ $S([E])=3,$ $S([AB])=2,$ $S([BC])=2,$ and $S([ABC])=1.$ In the example above, the normalization factor can be equal to (10+2+3+1+3+2+2+1)=24. The word probability values are thus normalized as follows:

$P([A])=10/24=0.417,$ $P([B])=2/24=0.083,$ $P([C])=3/24=0.125,$ $P([E])=3/24=0.125,$ $P([D])=1/24=0.0417,$ $P([AB])=2/24=0.0833,$ $P([BC])=2/24=0.0833,$ and $P([ABC])=1/24=0.0417.$ The words and the associated word probability values can be stored in the stored in the table 414, thus completing the initial iteration In the second iteration, the probability values of the segmentations are adjusted according to the word probability values obtained in the first iteration:

$P([ABC][D][A][E])=0.0417*0.0417*0.417*0.125=0.0000906,$ $P([AB][C][D][A][E])=0.0833*0.125*0.0417*0.417*0.125=0.0000226,$ $P([A][BC][D][A][E])=0.417*0.0833*0.0417*0.417*0.125=0.0000755,$ and $P([A][B][C][D][A][E])=0.417*0.0833*0.125*0.0417*0.417*0.125=0.00000944.$ Likewise, the word soft-count values are adjusted according to the segmentation probability values, divide by the normalization factor, which can be the sum of probability values of all possible segmentations. In this example, the normalization factor is equal to 0.0000906+0.0000226+0.0000755+0.00000944=0.000198. The word soft-count values are as follows:

$S([A]) =$
$(0.0000906 + 0.0000226 + 0.0000755*2 + 0.00000944*2)/0.000198 =$
$1.34,$ $S([B]) = 0.00000944/0.000198 = 0.0477,$ $S([C]) =$
$(0.0000226 + 0.0000755)/0.000198 = 0.0000981/0.000198 = 0.495,$ $S([D]) =$
$(0.0000906 + 0.0000226 + 0.0000755 + 0.00000944)/0.000198 = 1,$ $S([E]) =$
$(0.0000906 + 0.0000226 + 0.0000755 + 0.00000944)/0.000198 = 1,$ $S([AB]) = 0.0000226/0.000198 = 0.114,$

-continued $$S([BC]) = 0.0000755/0.000198 = 0.381,$$

and $$S([ABC]) = 0.0000906/0.000198 = 0.458.$$

The soft-counts from all the sentences are accumulated and normalized to obtain the probability values of the words, which are used to calculate the segmentation probability values in the next iteration, and so forth. The iterative process continues until a convergence or termination condition occurs. For example, the iterative process can be terminated after a predetermined number of iterations, or after the word probability values converge such that changes in the word probability values from one iteration to the next are less than a predetermined threshold. Other convergence or termination conditions can also be used.

In some implementation, the soft-counting can be performed by dynamic programming. For example, assume that a sentence is "$C_1 C_2 C_3 \ldots C_n$", where each of "$C_1$", "$C_2$", "$C_3$", etc., is a character. For any word $C_{j1} \ldots C_{j2}$ inside this sentence, its count can be increased by $S_{j1}^{left} \cdot p(C_{j1} \ldots C_{j2}) \cdot S_{j2}^{right}/\alpha$, where $S_{j1}^{left}$ is the sum of the likelihood of all the possible segmentations of the substring to the left of $C_{j1}$, $p(C_{j1} \ldots C_{j2})$ is the current estimate of the probability of the word $C_{j1} \ldots C_{j2}$, $S_{j2}^{right}$ is the sum of the likelihood of all the possible segmentations of the substring to the right of $C_{j2}$, and $\alpha$ is the normalizing constant, which is the sum of the likelihood of all the possible segmentations of this sentence. $\alpha$ is equal to $S_{n+1}^{left}$.

The values of $S_{j1}^{left}$ and $S_{j2}^{right}$ can likewise be computed by dynamic programming. For example, the recursive function for $S_i^{left}$ is $$S_i^{left} = \begin{cases} 1 & \text{if } i = 1 \\ p(C_1) & \text{if } i = 2 \\ \sum_{j=1}^{i-1} p(C_j \ldots C_{i-1}) \cdot S_j^{left} & \text{if } i > 2 \end{cases}$$

The values of $S_i^{left}$ are computed for $i=1, 2, \ldots, n+1$ from left to right of the sentence, at the end of which $\alpha = S_{n+1}^{left}$ is obtained. Then the values $S_i^{right}$ are computed for $i=n, n-1, \ldots 3, 2, 1$ from right to left of the sentence. The soft-count value of the word $C_{j1} \ldots C_{j2}$ can then be determined using the formula $S_{j1}^{left} \cdot p(C_{j1} \ldots C_{j2}) \cdot S_{j2}^{right}/\alpha$.

In some implementations, indexing and/or parallel processing of the documents can be utilized. Because the number of documents in the document corpus 404 can be large indexing and/or parallel processing can reduce processing times. In some implementations, processing of the document corpus 404 can be performed in parallel using, for example, a MapReduce programming model, described in "MapReduce: Simplified Data Processing on Large Clusters" by Jeffrey Dean and Sanjay Ghemawat, Sixth Symposium on Operating System Design and Implementation, San Francisco, Calif., December, 2004, the contents of which are herein incorporated by reference.

At the end of the iterative process, the final probability values of all the words in the word corpus 402 are determined. In some implementations, the word probability determination engine 400 selects a predetermined number (e.g., 300,000) of words having the highest probability values and stores the selected words and their associated word probability values in the dictionary 406 to be accessed by the IME system 120. The dictionary 406 can be part of, e.g., the dictionary 124 of FIG. 2. In other implementations, the entire word corpus and associated probability values can be stored in the dictionary 406.

Figure 5:
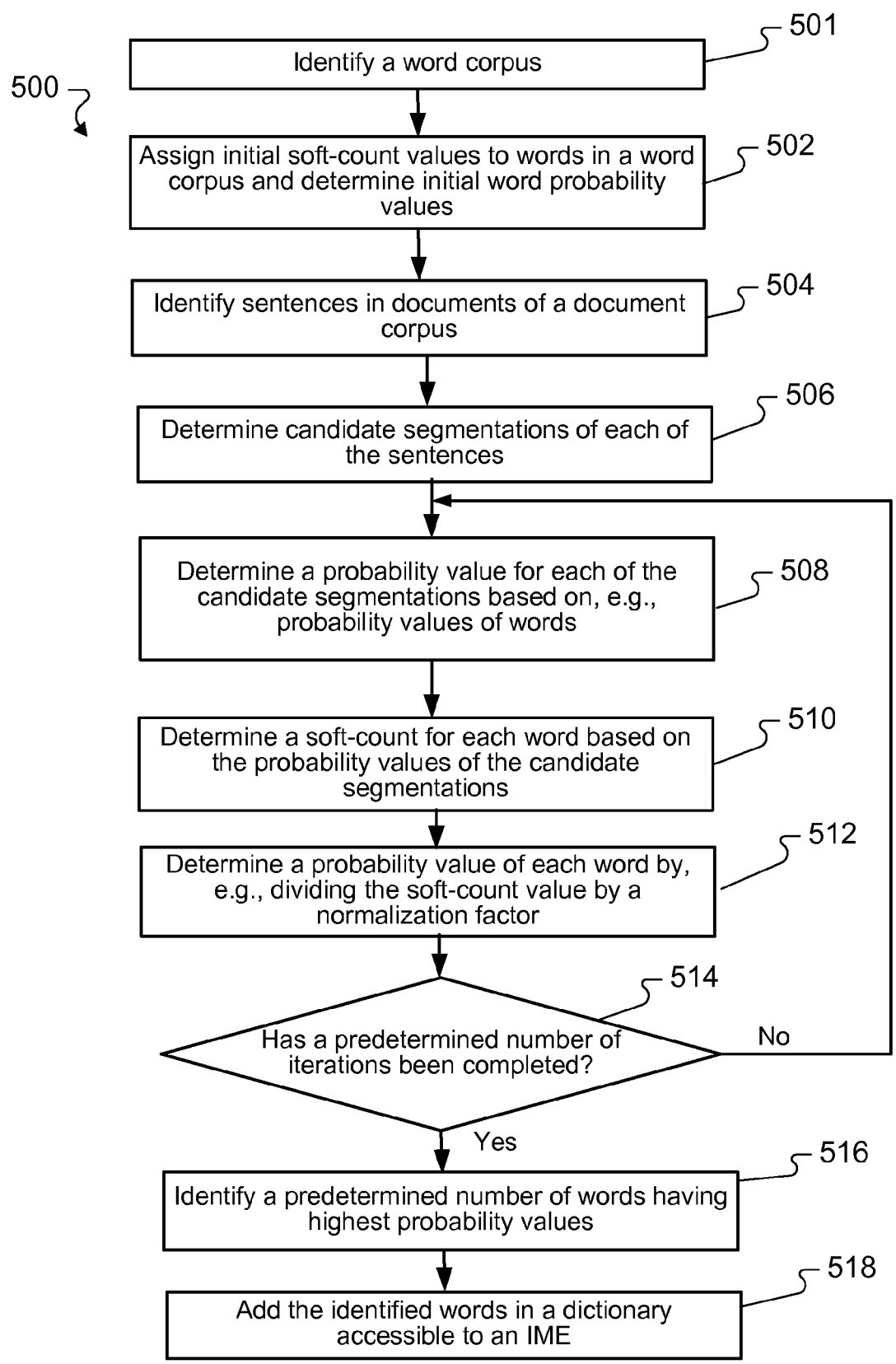
FIGS. 5-7 are flow diagrams of processes for determining word probability values.

FIG. 5 is a flow diagram of an example process 500 to determine the probability values of words in a word corpus (e.g., the word corpus 402) based on occurrences of the words in a document corpus (e.g., the document corpus 404). The process 500 can, for example, be implemented in a system that includes one or more server computers.

The process 500 identifies a word corpus (501). For example, the word corpus can be the word corpus 402 of FIG. 4. In the process 500, initial soft-count values are assigned to words in a word corpus and initial word probability values are determined (502). For example, the word probability determination engine 400 can assign initial soft-count values and initial word probability values.

The process 500 identifies sentences in documents of a document corpus (504). The process 500 determines candidate segmentations of each of the sentences based on the words in the word corpus (506). For example, candidate segmentations can be determined by the word segmentation engine 410.

The process 500 determines probability value for each of the candidate segmentations based on, e.g., probability values of the words in the candidate segmentation (508). For example, the probability value for a candidate segmentation can be determined by multiplying the probability values of the words in the candidate segmentation. In some implementations, the segmentation probability values are multiplied by weight values based on the type of documents from which the segmentations are derived.

The process 500 determines a soft-count for each word based on the probability values of the candidate segmentations (510). For example, a soft-count of a word or phrase can be determined by adding the contributions of the probability values of all segmentations in which the word appears.

The process 500 determines a probability value of each word by dividing the soft-count by a normalization factor (512). The normalization factor can be, e.g., the sum of all soft-counts.

The process 500 determines if a termination condition as occurred (514). An termination condition can, for example, include the performance of a predetermined number of iterations, or a convergence of probability values, or some other condition.

If a termination condition has not occurred, the determination of the segmentation probability values (508), determination of the soft-counts (510), and determination of the word probability values (512) are repeated.

If a termination condition has not occurred, the process 500 identifies a predetermined number (e.g., 300,000) of words having highest probability values (516).

The process 500 adds the selected predetermined number of words to a dictionary accessible to an input method editor (518). For example, the IME can be the IME system 120 of FIG. 2, and the predetermined number of words can be included in the dictionary 124.

Figure 6:
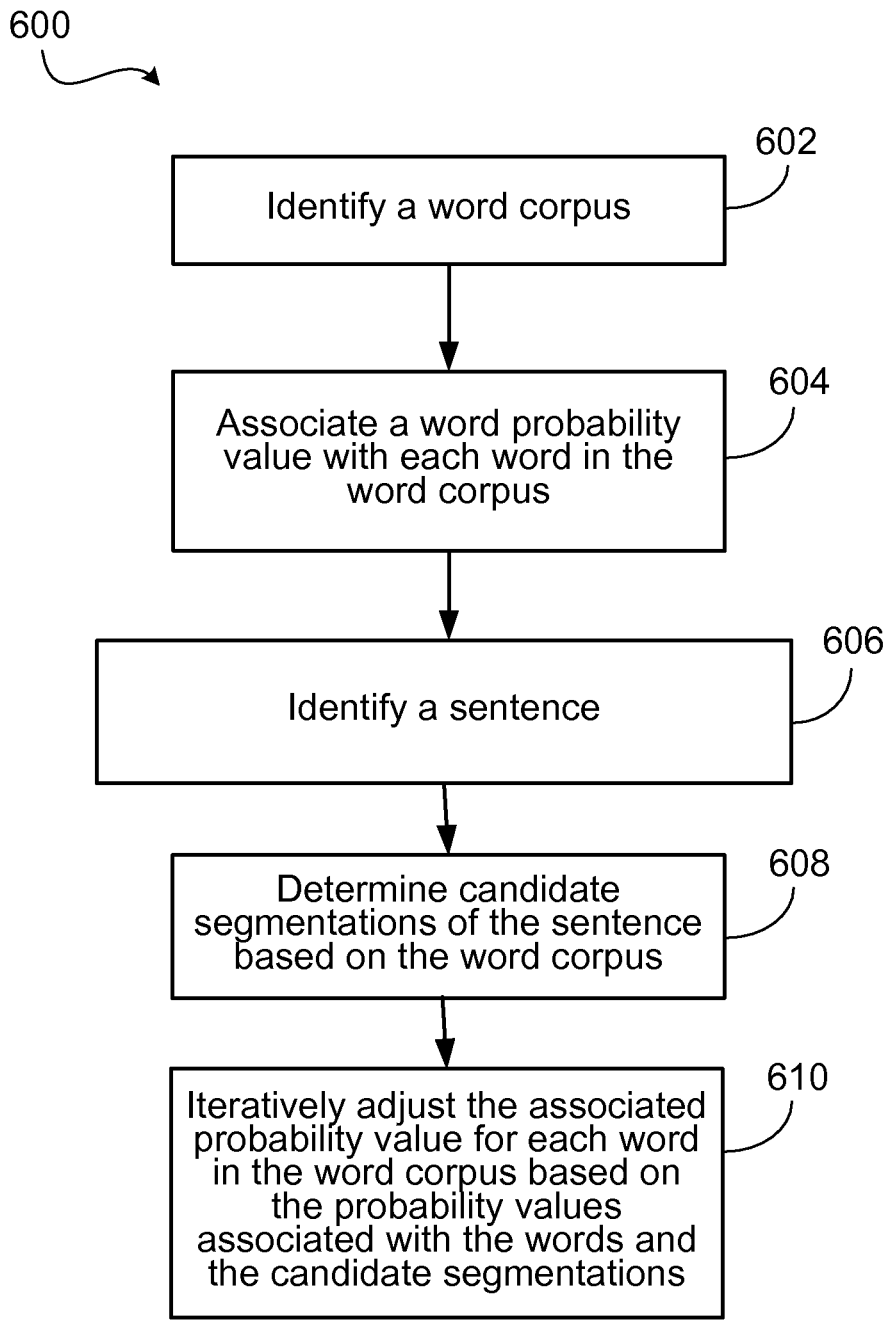

FIG. 6 is a flow diagram of an example process 600 to determine the probability values of words in a word corpus based on occurrences of the words in a document corpus. The process 600 can, for example, be implemented in a system that includes one or more server computers.

The process 600 identifies a word corpus (602). For example, the word corpus can be the word corpus 402 of FIG.

4. The process 600 associates a word probability value with each word in the word corpus (604). For example, the word probability determination engine 400 can associate a word probability value with each word in the word corpus 402. The process 600 identifies a sentence (606). For example, the word probability determination engine 400 can identify a sentence from the document corpus 404. The process 600 determines candidate segmentations of the sentence based on the word corpus (608). For example, the word probability determination engine 400 can determine the candidate segmentations of the sentence. The process 600 iteratively adjusting the associated probability value for each word in the word corpus based on the probability values associated with the words and the candidate segmentations (610). For example, the word probability determination engine 400 can iteratively adjust the associated probability value for each word.

Figure 7:
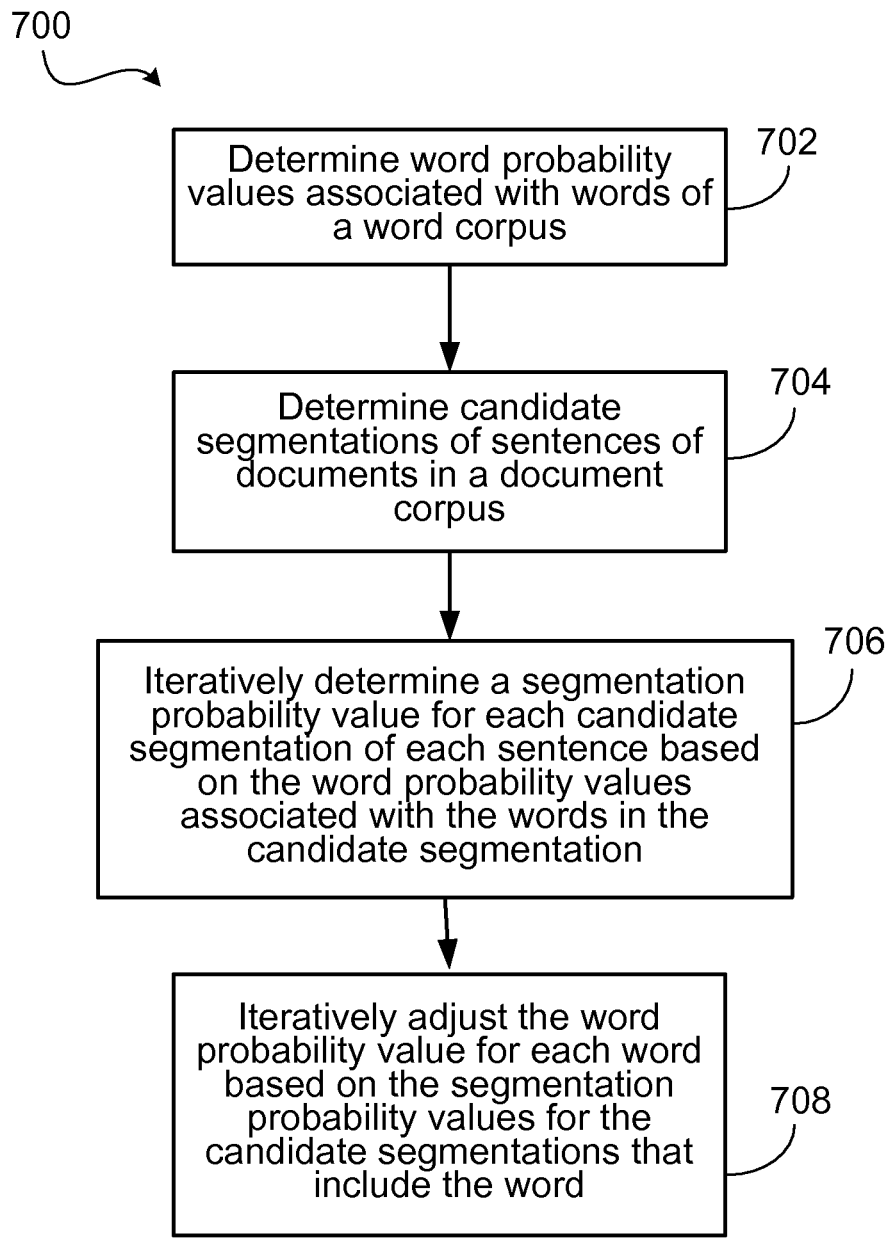

FIG. 7 is a flow diagram of an example process 700 to determine the probability values of words in a word corpus based on occurrences of the words in a document corpus. The process 700 can, for example, be implemented in a system that includes one or more server computers.

The process 700 determines word probability values associated with words of a word corpus (702). For example, the word corpus can be the word corpus 402 of FIG. 4. The process 700 determines candidate segmentations of sentences of documents in a document corpus (704). For example, the document corpus can be the document corpus 404. The process 700 iteratively determines a segmentation probability value for each candidate segmentation of each sentence based on the word probability values associated with the words in the candidate segmentation (706). For example, the word probability determination engine 400 can iteratively determine the segmentation probability values. The process 700 iteratively adjusts the word probability value for each word based on the segmentation probability values for the candidate segmentations that include the word (708). For example, the word probability determination engine 400 can iteratively adjust the word probability values.

Although various implementations have been described, other implementations can also be used. For example, the input engine 122 can be capable of mapping composition inputs from a western keyboard to input Chinese, Japanese, Korean and/or Indic characters. In some examples, some or all implementations described can be applicable to other input methods, such as Cangjie input method, Jiufang input method, Wubi input method, or other input methods. The weight values for different types of documents, and the classification of types of documents, can be different from those described above. The number of words, phrases, and documents being processed, and the sources of the documents in the document corpus 404, can be different from those described above.

In some implementations, several dictionaries, e.g., a legal dictionary, a medical dictionary, a science dictionary, and a general dictionary, can be used. Each dictionary can be established by starting with a dictionary associated with a particular field. The word probability determination engine 400 is used to process a document corpus having documents biased toward the field associated with the dictionary. For example, to establish the probability values of the words in the legal dictionary, a document corpus having documents biased toward the legal field can be used. The IME system 120 can allow the user to select the field of interest (e.g., legal, medical, science) when entering characters, and the candidate words can be selected from the dictionary related to the field of interest.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   identifying a word corpus;
   determining a weight based on a type of the word corpus, the weight indicating a degree of reliability for updating an existing input method editor dictionary using the word corpus;
   associating a word probability value with each word in the word corpus;
   identifying a sentence;
   determining candidate segmentations of the sentence based on the word corpus;
   determining a segmentation probability value for each of the candidate segmentations, each candidate segmentation having one or more segments that define words forming the sentence;
   determining a weighted segmentation probability value for each segmentation probability value based on the weight;
   determining, in a data processing apparatus, a soft-count value for each word in the word corpus based on the weighted segmentation probability values of the candidate segmentations in which the word appears and a number of occurrences of the word in the candidate segmentations in which the word appears;
   iteratively adjusting the associated word probability value for each word in the word corpus based on the soft-count value for the word; and
   updating the existing input method editor dictionary by iteratively adding a plurality of words from the word corpus and their respective associated word probability values to the existing input method editor dictionary, wherein the plurality of words from the word corpus are words having the highest associated word probability values.

2. The method of claim 1 wherein the word probability values correspond to a probability of associated words appearing in the sentence.

3. The method of claim 1 wherein determining candidate segmentations of the sentence comprises determining all possible segmentations of the sentence based on the word corpus.

4. The method of claim 1 wherein determining a segmentation probability value for each candidate segmentation of the sentence comprises determining the segmentation probability value for each candidate segmentation based on the word probability values associated with the words in the candidate segmentation.

5. The method of claim 1 wherein iteratively adjusting the associated word probability value for each word in the word corpus based on the associated word probability values and the candidate segmentations comprises iteratively adjusting the associated word probability value for each word based on the weighted segmentation probability values for the candidate segmentations of the sentence.

6. The method of claim 1 wherein iteratively adjusting the associated word probability value for each word comprises, for each iteration,
   determining the weighted segmentation probability value for each candidate segmentation of the sentence based on the word probability values associated with the words in the candidate segmentation, and
   adjusting the associated word probability value for each word based on the weighted segmentation probability values for the candidate segmentations that include the word.

7. The method of claim 1 wherein determining a soft-count value of a word in the sentence comprises multiplying a sum of the weighted segmentation probability values of candidate segmentations of a substring before the word, the probability value of the word, and a sum of the weighted segmentation probability values of candidate segmentations of a substring after the word.

8. The method of claim 1, wherein the plurality of words is a specified number of words from the word corpus.

9. The method of claim 1, wherein the weight is proportional to the degree of reliability, and wherein a larger weight causes larger adjustments to the associated word probability values.

10. The method of claim 9, wherein the degree of reliability for updating the existing input method editor dictionary using the word corpus is based on a level of formality of the word corpus, and wherein a specific word corpus having a greater level of formality has a greater degree of reliability.

11. The method of claim 1, wherein iteratively adjusting the associated word probability value for each word in the word corpus based on the soft-count value for the word is performed until (i) word probability values for a predetermined number of words have stabilized or (ii) a predetermined number of iterations have completed.

12. A computer-implemented method comprising:
   determining word probability values associated with words in a word corpus;
   determining a weight based on a type of the word corpus, the weight indicating a degree of reliability for updating an existing input method editor dictionary using the word corpus;
   determining candidate segmentations of sentences of documents in a document corpus, each candidate segmentation having one or more segments that define words forming the sentence;
   iteratively determining a segmentation probability value for each candidate segmentation of each sentence based on the word probability values associated with the words in the candidate segmentation;
   determining a weighted segmentation probability value for each segmentation probability value based on the weight;
   determining, in a data processing apparatus, a soft-count value for each word in the word corpus based on the weighted segmentation probability values of the candidate segmentations in which the word appears and a number of occurrences of the word in the candidate segmentations in which the word appears;
   iteratively adjusting the word probability value for each word in the word corpus based on the soft-count for the word; and
   updating the existing input method editor dictionary by iteratively adding a plurality of words from the word corpus and their respective associated word probability values to the existing input method editor dictionary, wherein the plurality of words from the word corpus are words having the highest associated word probability values.

13. The method of claim 12, further comprising accumulating a count for each word based on the weighted segmentation probability values of the segmentations that include the word.

14. The method of claim 13 wherein accumulating the count for each word comprises determining a sum of the weighted segmentation probability values of the segmentations that include the word.

15. The method of claim 13, comprising determining the word probability value for each word by normalizing the count for the word based on a normalization factor.

16. The method of claim 13, comprising determining the normalization factor by determining a sum of the counts of all the words.

17. The method of claim 12, wherein the weight is proportional to the degree of reliability, and wherein a larger weight causes larger adjustments to the associated word probability values.

18. The method of claim 17, wherein the degree of reliability for updating the existing input method editor dictionary using the word corpus is based on a level of formality of the word corpus, and wherein a specific word corpus having a greater level of formality has a greater degree of reliability.

19. The method of claim 12, wherein iteratively adjusting the associated word probability value for each word in the word corpus based on the soft-count value for the word is performed until (i) word probability values for a predetermined number of words have stabilized or (ii) a predetermined number of iterations have completed.

20. A system, comprising:
   a data store to store a word corpus and a document corpus; and
   a processing engine stored in computer readable medium and comprising instructions executable by a processing device that upon such execution cause the processing device to:
      associate a word probability value with each word in the word corpus;
      determine a weight based on a type of the word corpus, the weight indicating a degree of reliability for updating an existing input method editor dictionary using the word corpus;
      determine candidate segmentations of each sentence of each document in the document corpus based on the word corpus, each candidate segmentation having one or more segments that define words forming the sentence;
      determine a segmentation probability value for each of the candidate segmentations;
      determine a weighted segmentation probability value for each segmentation probability value based on the weight;
      determine a soft-count value for each word based on the weighted segmentation probability values of the candidate segmentations in which the word appears and a number of occurrences of the word in the candidate segmentations in which the word appears;

iteratively adjust the associated word probability value for each word in the word corpus based on the associated word probability values and the candidate segmentations; and update the existing input method editor dictionary by iteratively adding a plurality of words from the word corpus and their respective associated word probability values to the existing input method editor dictionary, wherein the plurality of words from the word corpus are words having the highest associated word probability values.

21. The system of claim 20 wherein the processing device determines candidate segmentations of each sentence by iteratively determining a segmentation probability value for each candidate segmentation of each sentence based on the word probability values associated with the words in the candidate segmentation.

22. The system of claim 20, wherein the weight is proportional to the degree of reliability, and wherein a larger weight causes larger adjustments to the associated word probability values.

23. The system of claim 20, wherein the processing device iteratively adjusts the associated word probability value for each word in the word corpus based on the soft-count value for the word is performed until (i) word probability values for a predetermined number of words have stabilized or (ii) a predetermined number of iterations have completed.

24. A system, comprising:
a machine readable storage device including a program product; and
one or more processors operable to execute the program product and perform operations comprising:
associating a word probability value with words in a word corpus;
determining a weight based on a type of the word corpus, the weight indicating a degree of reliability for updating an existing input method editor dictionary using the word corpus;
identifying sentences in a plurality of documents;
determining candidate segmentations of each of the sentences based on the word corpus, each candidate segmentation having one or more segments that define words forming the sentence;
determining a segmentation probability value for each of the candidate segmentations;
determining a weighted segmentation probability value for each segmentation probability value based on the weight;
determining a soft-count value for each word based on the weighted segmentation probability values of the candidate segmentations in which the word appears and a number of occurrences of the word in the candidate segmentations in which the word appears;
iteratively adjusting the associated word probability value for each word in the word corpus based on the soft-count value for the word; and
updating the existing input method editor dictionary by iteratively adding a plurality of words from the word corpus and their respective associated word probability values to the existing input method editor dictionary, wherein the plurality of words from the word corpus are words having the highest associated word probability values.

25. The system of claim 24, wherein the weight is proportional to the degree of reliability, and wherein a larger weight causes larger adjustments to the associated word probability values.

26. The system of claim 24, wherein the operations include iteratively adjusting the associated word probability value for each word in the word corpus based on the soft-count value for the word is performed until (i) word probability values for a predetermined number of words have stabilized or (ii) a predetermined number of iterations have completed.

* * * * *